United States Patent [19]

Loiacono

[11] Patent Number: 4,849,739
[45] Date of Patent: Jul. 18, 1989

[54] LIQUID DETECTOR FOR AIR PRESSURE TYPE FIRE SPRINKLER SYSTEM

[75] Inventor: Dominic Loiacono, Franklin Lakes, N.J.

[73] Assignee: Ala Inc., a New Jersey Corporation, West Paterson, N.J.

[21] Appl. No.: 214,845

[22] Filed: Jun. 30, 1988

Related U.S. Application Data

[63] Continuation of Ser. No. 5,013, Jan. 13, 1987, abandoned, which is a continuation of Ser. No. 635,581, Jul. 30, 1984, abandoned.

[51] Int. Cl.⁴ .............................................. G08B 21/00
[52] U.S. Cl. ................................... 340/620; 340/603; 73/304 R; 169/23
[58] Field of Search ................ 340/602–617, 340/620; 200/84 R, 61.04, 61.05; 73/304 R, 304 C; 169/23; 324/65 R, 65 P, 61 P; 137/386, 392, 554, 557, 558

[56] References Cited

U.S. PATENT DOCUMENTS

| | | | |
|---|---|---|---|
| 246,718 | 9/1881 | Cable | 73/308 |
| 1,364,340 | 1/1921 | Wilson | 169/23 |
| 1,683,362 | 9/1928 | Löffer | 340/620 |
| 1,950,029 | 9/1928 | Hamilton et al. | 169/17 |
| 1,972,034 | 8/1934 | Rowley | 169/17 |
| 1,977,898 | 10/1934 | Seniff | 177/311 |
| 2,748,379 | 5/1953 | Brown | 340/614 |
| 2,882,914 | 7/1955 | Wiley et al. | 137/2 |
| 2,955,466 | 10/1960 | Coles | 73/290 |
| 3,069,671 | 12/1962 | Taylor | 340/616 |
| 3,186,228 | 6/1965 | Lever et al. | 73/362 |
| 3,310,795 | 3/1967 | David | 340/624 |
| 3,329,215 | 7/1967 | Kane | 169/17 |
| 3,339,411 | 6/1965 | Riffie | 73/304 |
| 3,398,550 | 8/1968 | Lents | 62/172 |
| 3,399,399 | 7/1965 | Apfelbaum | 340/507 |
| 3,834,462 | 9/1974 | Orloff et al. | 169/17 |
| 4,392,128 | 7/1983 | Young et al. | 340/616 |

FOREIGN PATENT DOCUMENTS

| | | |
|---|---|---|
| 831544 | 3/1960 | United Kingdom . |
| 1266537 | 3/1972 | United Kingdom . |
| 1488199 | 10/1977 | United Kingdom . |
| 1581327 | 12/1980 | United Kingdom . |

Primary Examiner—Joseph A. Orsino
Assistant Examiner—Jeffery A. Hofsass
Attorney, Agent, or Firm—Rosen, Dainow & Jacobs

[57] ABSTRACT

The detector includes an electrically conductive probe located within a drum drip adjacent the bottom end thereof, close to the conventional discharge gate valve. Water which accumulates in the drum drip makes contact with the probe, and a circuit is completed between the probe and the conductive wall of the drum drip. This circuit includes a local and/or remote alarm or indicating device.

11 Claims, 2 Drawing Sheets

LIQUID DETECTOR FOR AIR PRESSURE TYPE FIRE SPRINKLER SYSTEM

This application is a continuation of application Ser. No. 635,581, filed July 30, 1984 and application Ser. No. 005,013, filed Jan. 13, 1987, both now abandoned.

BACKGROUND OF THE INVENTION

This invention relates generally to an air pressure type fire sprinkler system and more particularly to a liquid detector located in the drum drips of such a system. Many fire protection systems now in use employ a plurality of thermally operated sprinkler heads connected to a piping network located in an elevated position in the space which is to be protected. In response to a local ambient temperature above a predetermined level, individual heads actuate and discharge water or other liquid in the immediate vicinity. When the system is filled with water, the response is rapid after one or more of the sprinkler heads are actuated by elevated temperature.

However, in low temperature environments such as in food warehouses, freezers, and the like, it is undesirable to maintain water in the piping network except during emergencies because stagnant water will freeze and cause blockage or actual physical damage to the system. To overcome this difficulty, systems are filled with pressurized gas instead of water. When a sprinkler head is actuated by elevated temperature and opens, gas pressure is lost and a pressure sensitive device triggers a water valve which then fills the system with water directed to the actuated sprinkler head.

Unfortunately, the practical problems of an actual system for a cold ambient are not entirely resolved by the air pressure type fire sprinkler system because some liquid and moisture is always present in the pipes and in gas which pressurizes the pipes. Under sufficiently cold ambient conditions, the moisture condenses within the piping system and, as liquid, is subject to freezing whereby the piping system is jeopardized. A ruptured pipe causes a loss of gas pressure, triggering the water valve and causing a discharge of water with a potential for physical damage of goods and property.

Commercial fire sprinkler systems of the dry air type, that is the air pressure type, are provided with low end drains known as drum drips. These drum drips are substantially vertical pipes connected to the overhead piping and positioned such that residual and condensate in the pipes will drain into the drum drips which are fitted with gate valves at their lower ends. Periodically, the gate valves are opened and accumulated water and condensate may be removed. Otherwise, the drum drips themselves are in danger of being ruptured if freezing occurs even though the water collected therein is a small quantity. Rupture of a drum drip in an air pressure system will produce a false fire indication and actuation of the water valve which in turn will result in flooding the space which is protected by the sprinkler system. Because the sources of the water in the drum drips are so variable, that is, condensation, and moisture in the gas supply, it is difficult to know when the drum drips need to be emptied.

What is needed is a detector for liquid in the drum drips which is actuated by the presence of accumulated water and thus provides an indication of this presence. Then the drum drip can be emptied before a dangerous condition is produced.

SUMMARY OF THE INVENTION

Generally speaking, in accordance with the invention, a liquid detector is provided for application in the drum drips, that is, the low end drains in commercial fire sprinkler systems of the dry air type. The detector includes an electrically conductive probe which is located within the drum drip adjacent the bottom end, close to the conventional discharge gate valve. When water accumulates in the drum drip to a level which makes contact with the probe, a circuit is completed between the probe and the conductive wall of the drum drip. This circuit includes a local and/or remote alarm or indicating device which is thereby actuated by the liquid in the drum drip. The probe passes through the wall of the drum drip by means of a hermetic seal and connector which is designed to prevent leakage of pressurizing gas and high pressure water which is used in testing the sprinkler system.

Accordingly, it is an object of this invention to provide are improved liquid detector for air pressure type fire sprinkler systems which responds to low accumulations of liquid as result from condensation in low ambient temperatures.

Another object of this invention is to provide an improved liquid detector for an air pressure type fire sprinkler system which is simple in construction, has no moving parts in contact with liquid and is easily installed and maintained.

A further object of this invention is to provide an improved liquid detector for air pressure type fire sprinkler systems which can provide both local and remote indications of undesirable water conditions in the system.

Still other objects and advantages of the invention will in part be obvious and will in part be apparent from the specification. The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
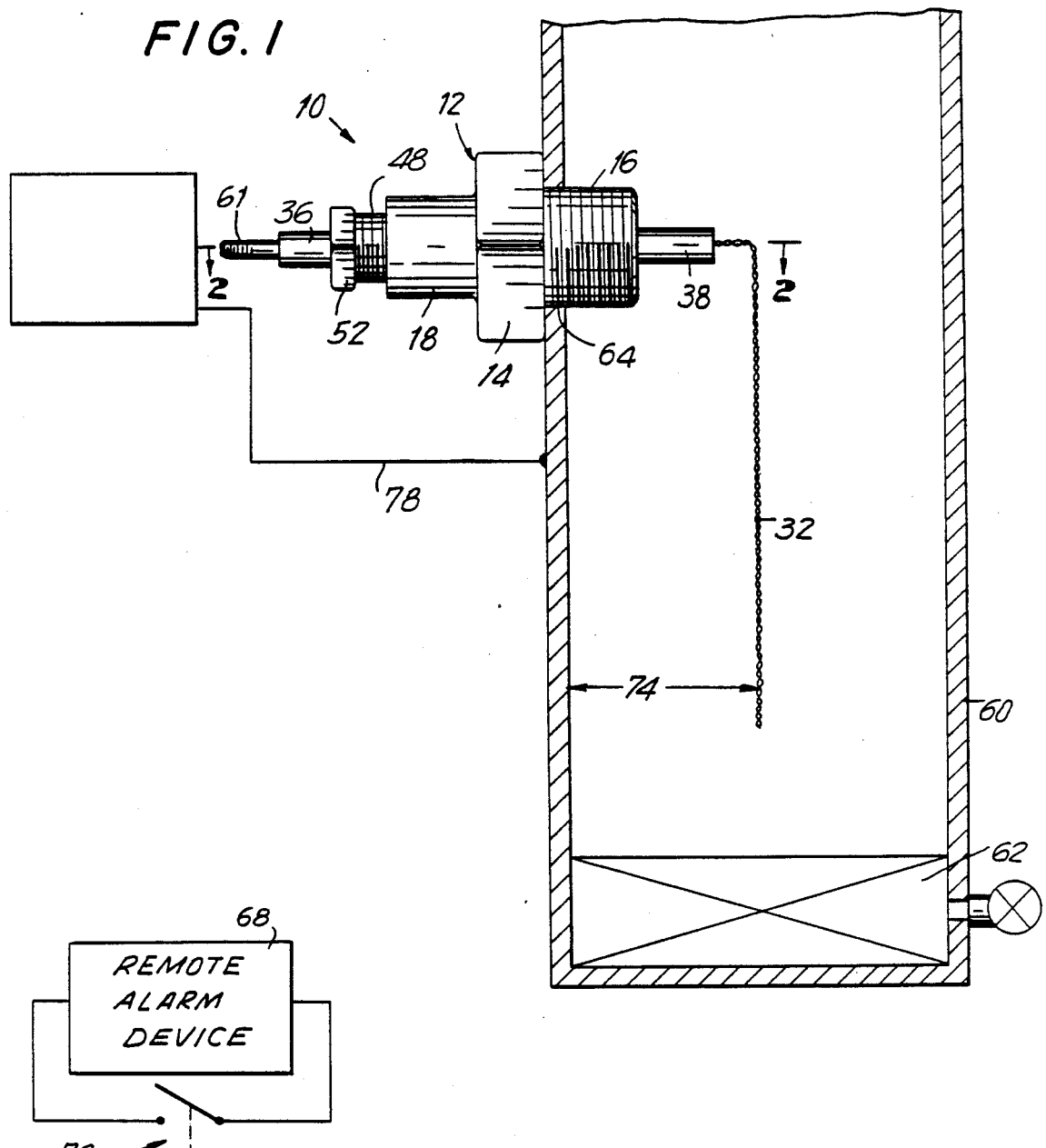
FIG. 1 illustrates a liquid detector in accordance with the invention mounted in a drum drip for an air pressure fire sprinkler system.

With reference to the figures, the liquid detector 10 includes a fitting 12 made of rigid material, for example, a tough distortion resistant plastic such as a polycarbonate or metal such as brass, having a center portion 14 with flat surfaces thereon suitable for gripping with a wrench. An externally threaded nipple 16 extends from one end of the center portion 14 and an internally threaded stub 18 extends from the other end of the portion 14. A smooth bore 20 in the 16 meets the partially threaded bore 22 within the center 14. The diameter of the bore 22 is greater than the diameter of the bore 20 and concentric therewith to form an annular shoulder 26 at the intersection of the two bores 20, 22.

Figure 2:
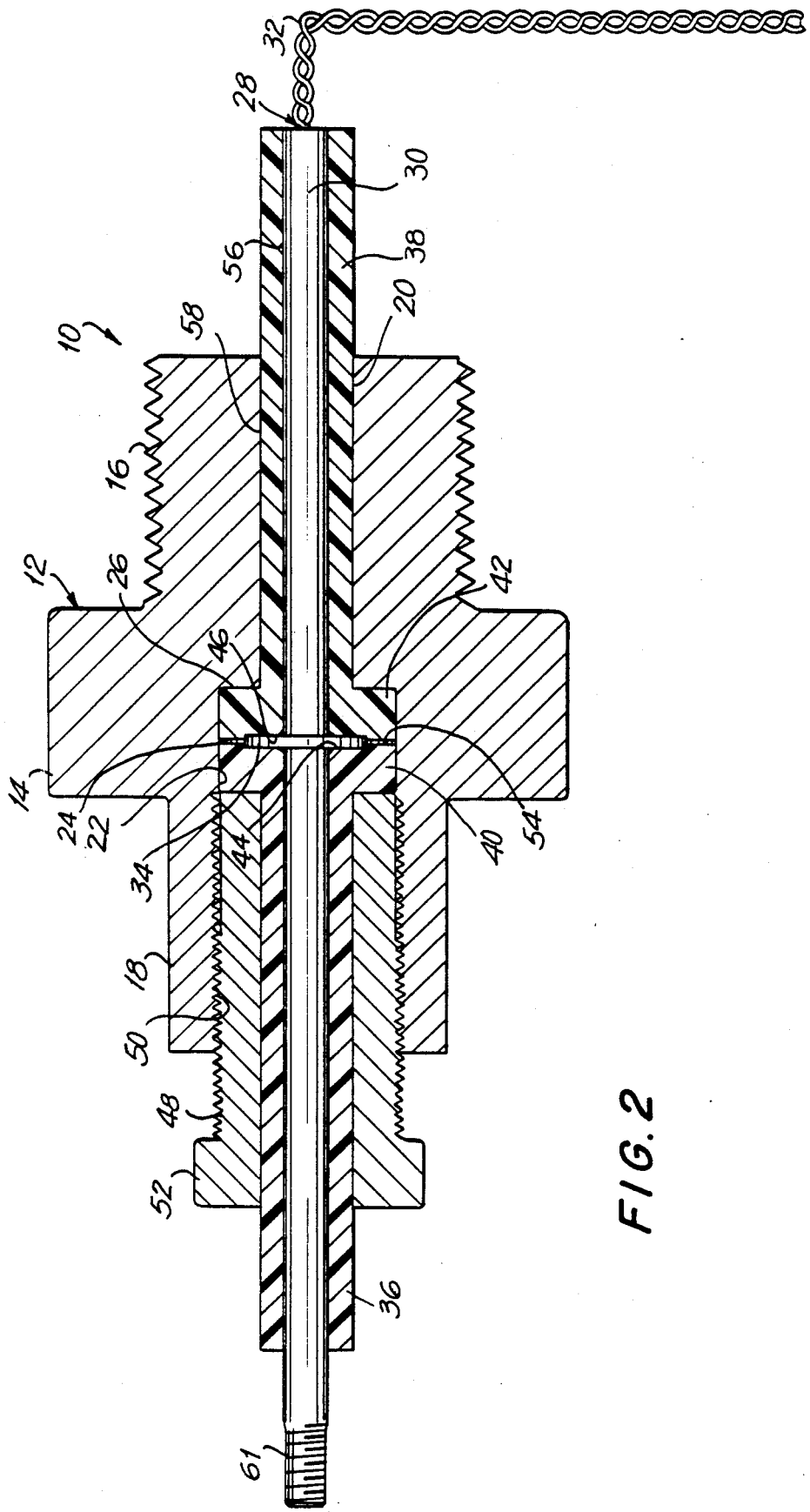
FIG. 2 is a sectional view of the liquid detector of FIG. 1 taken along the line 2—2 of FIG. 1.

The liquid detector 10 also includes a probe 28, made of an electrically conducting rod 30 which is mechanically and electrically connected to a conductive wire 32 formed of malleable material. As best illustrated in FIG. 2, the conductive rod 30 includes a circular disk 34 which is fixedly connected to the rod 30 and, as explained more fully hereinafter, is located in the assembled detector within a cylindrical chamber 24 within the fitting 12. The disk 34 may be held in position on the rod 30 in any suitable manner, for example, brazing or welding to the rod 30 may be appropriate.

Bushings 36, 38, fabricated of electrically non-conducting material surround the rod 30 on both sides of the disk 34. The bushings are hollow cylinders having flanges 40, 42 of a diameter greater than disk 34. The opposed faces of the flanges 40, 42 have recesses 44, 46 respectively wherein the disk 34 is cradled in the assembled condition as shown in FIG. 2. The bushing 36, 38 are fabricated from a material having a degree of resiliency, for example of teflon, nylon or polyvinyl plastic.

An externally threaded holding nut 48 engages the internal threads 50 of the stub 18. Flat surfaces 52 are provided on the holding nut 48 to allow for engagement with a wrench.

To assemble the liquid detector 10, the assembly of the rod 30 and wire 32 is slipped through the central opening of the bushing 38 while the wire 32 is a straight extension of the rod 30. Then the bushing 38 with the rod 30 seated therein is inserted into the fitting 12 with the wire 32 entering through the opening in the stub 18. The bushing 38 is inserted until the flange 42 seats against the annular shoulder 26 within the center portion 14 of the fitting 12. Then, the bushing 36 is slipped over the back end of the rod 30 with the flange 40 facing the disk 34.

Finally, the nut 48 is threaded into the stub 18 making engagement with the internal threads 50. The nut 48 is threaded until the flange 42 is firmly pressed against the shoulder 26 and the disk 34 is compressed between the bottom surfaces of the recesses 44, 46. The resiliency of the material from which the bushings 36, 38 are fabricated causes a liquid and gas tight seal to be formed between the bottom recess surfaces and the side surfaces of the disk 34. It should be noted that the recesses 44, 46 are dimensioned relative to the thickness of the disk 34 such that a small gap 54 exists between the flanges 40, 42. It should be appreciated that other assembly sequences will also be appropriate.

Thus, any leakage along the interface 56 between the bushing 38 and rod 30 is blocked by the seal between the flat surface of the recess 46 and side surface of the disk 34. Also, any potential leakage along the interface 58 between the nipple 16 and the bushing 38 is blocked by the seal of the flange 42 against the shoulder surface 26. Thereby a seal against escape of liquid and gas is effected by tightening of the nut 48 in the stub 18. Electrical isolation between the rod 30, wire 32 and fitting 12 is also provided by the bushings 36, 38. Water pressure at 500 psi is used in testing sprinkler systems. The seal in accordance with the invention has performed satisfactorily under such conditions.

As illustrated in FIG. 1, the wire 32 is twisted to provide a greater exposed surface area (compared to a straight untwisted wire) and bent so that when inserted in a vertical casing 60 of a drum drip, the main portion of the wire 32 is also vertical. The rod 30 is provided with threads 61 at the remote exterior end, which are useful for fastening an electrical conductor thereto.

The drum drip including the casing 60 is conventional and accordingly requires little detailed description here. The lower end of the casing 60 is terminated in a gate valve 62 which is generally manually operated although powered valves may also be used. The liquid detector 10 is connected to the casing 60 by threading the external thread of the nipple 16 into a threaded hole 64 in the casing wall in a conventional manner to provide a leak tight connection. The rod 30 and nipple 16 are dimensioned such that when the center portion 14 of the fitting 12 abuts the casing 60, the vertical portion of the wire 32 is approximately centered within the casing. It should be noted that the entire piping system may be vented with high velocity water. Accordingly, any foreign matter in the system flows through the casing at high velocity. Therefore, centering of the wire 32 aids in preventing a bridge of foreign material between the wire 32 and casing 60 and also minimizes the danger of damage to the detector from high velocity water and foreign matter passing through the casing.

Figure 3:
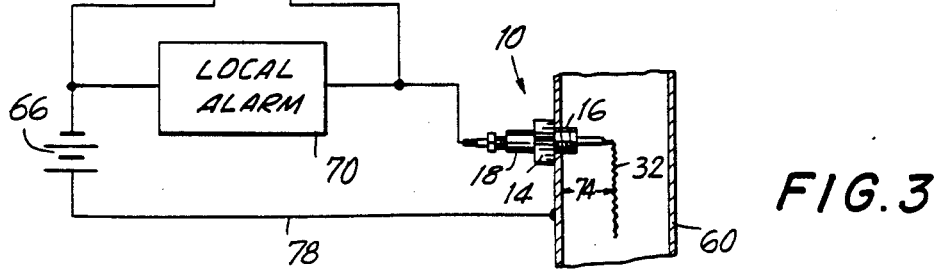
FIG. 3 is a semi-schematic circuit diagram illustrating an alarm system in connection with a liquid detector in accordance with the invention.

FIG. 3 illustrates the liquid detector 10 in circuit with a power supply 66, a remote alarm device 68, a remote alarm device 70 and a relay switch 72.

When there is an open gap 74 between the wire 32 and the casing 60, the circuit to the local alarm 70 and coil of the relay switch 72 is open and the contacts of the switch 72 are open. Thus, the local alarm device 70 and the remote alarm device 68 are inoperative. When liquid in the casing 60 bridges the gap 74 between the wire 32 and casing 60, an electrical circuit is completed which places the relay coil and local alarm device 70 in parallel across the power source 66 in series with the liquid resistance between the wire 32 and the casing 60. Thus, the coil and local alarm receive the full voltage of the power source 66 less any voltage drop across the gap 74. Current from the power source 66 flows through the relay switch coil closing the switch contacts and actuating the remote alarm device 68. The remote alarm device 68 is independently powered (not shown) and can be located at a considerable distance from the liquid detector 10 and casing 60.

The use of the single wire 32 in conjunction with the wall of the drum drip casing 60, as stated, reduces the possibilities that the gap 74 will be bridged by foreign matter that is, debris collecting in the drum drip. Thus the detector in accordance with the invention, by using the casing wall as an electrode connected to the power source 66 by a conductor 78, is superior to probes having two closely spaced electrodes to sense the presence of liquid within the casing 60. The foreign matter, which is very frequently found in such sprinkler systems, includes iron chips, teflon bits and pieces, etc. The undesired water in the drum drips tends to be gloppy in nature, that is somewhat viscous, and during system tests readily bridges the gap between probe electrodes which are close together.

Satisfactory operation of a system has been obtained with a 12 volt battery when the casing is of iron and the wire 32 is of twisted stainless steel. Operation of the system on low voltage, for example 12 volts, as indicated above is desirable and entirely feasible to reduce electrical hazards.

Operation of the alarm devices indicates that liquid is present in the drum drips and it is necessary that the drum drips be evacuated of liquid by opening of the gate valve 62. It should be understood that the casing need not be of metal so long as a conductive portion is included in or on the casing inner surface in opposition to the wire 32. Also a round disk 34 has been described. However, a flange or plate of any shape may be utilized so long as the flange surrounds and is sealed at its connection to the rod 30.

It will thus be seen that the objects set forth above, among those made apparent from the preceeding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid detector for attachment through the wall of a hollow downwardly extending drum drip of a dry pipe type fire-sprinkler system with compressed air, said drum drip including electrically conductive material at least at a lower portion of the hollow drum casing thereof, and at least one valve for release of accumulated electrically conductive liquid within the lower end of the drum drip, comprising:
    an electrically conductive fitting for connection within an aperture formed in the said hollow drum portion at or above said electrically conductive material, said fitting having a through opening and being adapted to provide, with the casing, an interconnection which is liquid-tight and gas-tight;
    an electrically conductive probe passing through said fitting opening so as to extend beyond either end of said fitting, the inward extending length of said probe beyond said fitting being elongate and exhibiting an exposed electrically conductive surface;
    means within said fitting for electrically insulating said probe from said fitting and for providing a liquid-tight and gas-tight seal therebetween, said electrically insulating means comprising a flange on the probe and located within the fitting, an electrically non-conductive, resilient, compressible bushing within the fitting surrounding the probe and abutting the probe flange, said bushing in the non-compressed condition being separable from the probe, and removable means at the fitting end outside of the drum casing for compressing the bushing causing the bushing to fill the fitting opening and be tightly pressed against the fitting and against the probe and the probe flange forming a liquid-tight and gas-tight seal therewith while preserving the electrical insulation between the probe and the fitting;
    whereby (a) when the fitting and its probe are assembled to the casing the said inward length can be configured to lie along within but spaced from the casing to define a gap with the electrically conductive material and (b) electrical circuit means adapted to indicate whether or not the gap is electrically conductive can be connected between the exposed outwardly extending probe and the electrically conductive material and thereby detect accumulated electrically conductive liquid therebetween.

2. A liquid detector as claimed in claim 1 wherein said probe is bendable.

3. A liquid detector as claimed in claim 1 wherein said probe includes an exposed conductive wire within said drum drip.

4. A liquid detector as claimed in claim 3 wherein said wire is twisted on itself.

5. A liquid detector as claimed in claim 3 wherein at least a portion of the wire is oriented parallel to the longitudinal axis of the drum drip.

6. A liquid detector as claimed in claim 3 wherein said probe further comprises an electrically conductive rod having one end connected to the wire within the drum drip, the rod passing through the fitting and being adapted to be connected at its other end to an electrical circuit.

7. A liquid detector as claimed in claim 6 wherein the flange is affixed to the rod, the flange being mounted in the fitting for removal in a direction externally of the drum drip.

8. A liquid detector as claimed in claim 3 wherein said wire is exposed to said drum drip along its entire length.

9. In a dry pipe fire-sprinkler system of the type containing compressed air;
    a low end drain connected to the fire-sprinkler system for collecting liquids present in the system, said liquids being electrically conductive, said system being pressurized in use, said low end drain comprising a hollow metal casing,
    at least one valve within the lower end of the drain casing for release of accumulated liquid to prevent freezing thereof,
    an electrically-conductive fitting mounted in a wall of the casing within an aperture therein, said fitting having a through-opening and being mounted to provide, with the casing, a liquid-tight and gas-tight seal,
    an electrically-conductive removable probe passing through said fitting opening so as to extend beyond either end of said fitting, the portion of said probe beyond said fitting extending into the casing and exhibiting an exposed electrically conductive surface, said inwardly-extending probe portion being configured to lie along within but spaced from the casing to define a gap with the casing side wall in the vicinity of the valve,
    means within said fitting for electrically insulating said probe from said fitting and for providing a liquid-tight and gas-tight seal therebetween, said means for electrically insulating and sealing the probe within the fitting comprising a flange on the probe and located within the fitting, an electrically nonconductive, resilient, compressible, removable bushing within the fitting and surrounding the probe portion remote from the casing and abutting the probe flange, said bushing in the non-compressed condition being separable from the probe, and removable means at the fitting end outside of the drain casing for compressing the bushing causing the bushing to fill the fitting opening and be tightly pressed against the fitting and against the probe and the probe flange forming a liquid-tight and gas-tight seal therewith while preserving the electrical insulation between the probe and the fitting and while allowing removal of said removable means to allow removal of said bushing and removal of said probe when desired, and electrical circuit means connected between the probe and the casing wall to indicate whether or not the gap is electrically conductive thereby detecting electrically conductive liquid which enters the gap as a warning to drain accumulated liquid to prevent freezing thereof.

10. The combination of claim 9 wherein the length of the inwardly-extending probe portion substantially exceeds the horizontal spacing between the casing walls.

11. In a dry pipe type fire-sprinkler system for operation at sub-freezing temperature and which contains air under pressure during use and which has an electrically-conductive low point drain and drain valve therein for draining accumulated water to prevent freezing thereof, a disassemblable liquid detector for detecting the presence of any accumulated water in the low point drain; said liquid detector comprising a metal fitting connected to the low point drain above the drain valve, an electrically-conductive probe extending through the fitting and terminating in a conductive part extending into the low point drain and forming therewith a gap which when filled with water allows current to flow between the probe and drain, removable means within said fitting and surrounding the probe for electrically insulating said probe from said fitting and for providing a liquid-tight and gas-tight seal therebetween that will prevent the escape of pressurized air, and means electrically connected between the probe and the drain to indicate whether the gap has been made electrically conductive due to it being filled with water, said fitting comprising a shoulder, the probe comprising an enlarged portion, and the removable means comprising a first flanged bushing within the fitting whose flange is located between the fitting shoulder and probe enlarged portion, a threaded member threadingly engaging the fitting outside of the drain, and a second flanged bushing whose flange is located between the probe enlarged portion and the threaded member, whereby rotation of the threaded member compresses the bushings against the probe and shoulder forming the said gas-tight seal.

* * * * *